(12) United States Patent
Kuroyanagi

(10) Patent No.: US 9,436,029 B2
(45) Date of Patent: Sep. 6, 2016

(54) THIN DISPLAY DEVICE

(71) Applicant: SHARP KABUSHIKI KAISHA, Osaka-shi, Osaka (JP)

(72) Inventor: Hitoshi Kuroyanagi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/585,026

(22) Filed: Dec. 29, 2014

(65) Prior Publication Data

US 2015/0116632 A1 Apr. 30, 2015

Related U.S. Application Data

(62) Division of application No. 14/296,132, filed on Jun. 4, 2014, now Pat. No. 8,964,145, which is a division of application No. 14/113,985, filed as application No. PCT/JP2012/060557 on Apr. 19, 2012, now Pat. No. 8,773,609.

(30) Foreign Application Priority Data

Apr. 27, 2011 (JP) ................. 2011-099034

(51) Int. Cl.
G02F 1/1333 (2006.01)
H02B 1/015 (2006.01)
H04N 5/64 (2006.01)

(52) U.S. Cl.
CPC .......... *G02F 1/133308* (2013.01); *H04N 5/64* (2013.01); *G02F 2001/13332* (2013.01); *G02F 2001/133311* (2013.01); *G02F 2001/133322* (2013.01); *G02F 2001/133325* (2013.01); *G02F 2001/133328* (2013.01); *G02F 2201/54* (2013.01)

(58) Field of Classification Search
CPC ................... G02F 1/133308; G02F 1/133608; G02F 1/13452; G02F 2001/13317; G02F 1/133615; G02F 2201/503; H02B 1/056; H02B 1/40; H02B 1/42

USPC ..................... 349/58, 60; 361/644
See application file for complete search history.

(56) References Cited

U.S. PATENT DOCUMENTS

| | | | |
|---|---|---|---|
| 6,937,297 B2 * | 8/2005 | Kang | G02F 1/133308 349/58 |
| 7,872,704 B2 * | 1/2011 | Ooami | G02F 1/133308 349/58 |
| 2008/0030642 A1 | 2/2008 | Harayama | |

FOREIGN PATENT DOCUMENTS

| JP | 63-153679 U | 10/1988 |
|---|---|---|
| JP | 7-314593 A | 12/1995 |

(Continued)

OTHER PUBLICATIONS

Japanese Office Action issued in Japanese Patent Application No. 2011-099034 on Jun. 26, 2012.

*Primary Examiner* — Mike Qi
(74) *Attorney, Agent, or Firm* — Birch, Stewart, Kolasch & Birch, LLP

(57) ABSTRACT

Provided is a technique related to a thin display device having a frame structure in which accuracy is ensured. First and second restricting convex portions (84, 85) are formed on the inner parts of a bending hole portion (83). A restricting face (84*a*) which is an end portion of the first restricting convex portion (84) takes an angle of 45 degrees sloping from upper left to the lower right. A restricting face (85*a*) which is an end portion of the second restricting convex portion (85) takes an angle of 45 degrees sloping from upper right to lower left. When bending processing is performed, the restricting face (84*a*) of the first restricting convex portion (84) abuts against the restricting face (85*a*) of the second restricting projection portion (85).

2 Claims, 27 Drawing Sheets

(56) References Cited

FOREIGN PATENT DOCUMENTS

| | | | |
|---|---|---|---|
| JP | 9-57351 A | 3/1997 |
| JP | 2002-237212 A | 8/2002 |
| JP | 2010-132306 A | 6/2010 |
| JP | 3161675 U | 8/2010 |
| JP | 2010-266623 A | 11/2010 |

* cited by examiner

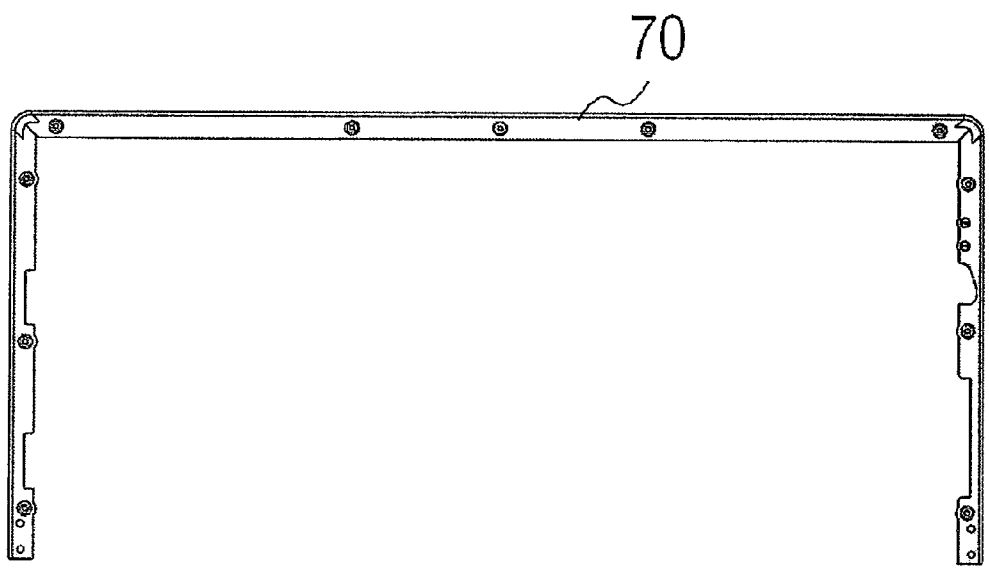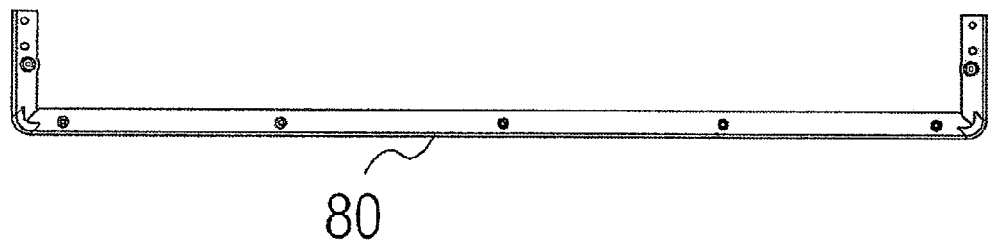
Fig. 7

20
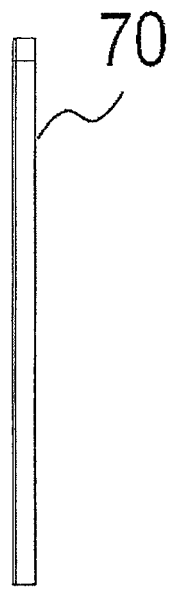
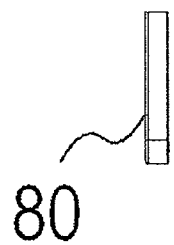
Fig. 8

CROSS SECTION
TAKEN ALONG A1-A1

CROSS SECTION
TAKEN ALONG A2-A2

THIN DISPLAY DEVICE

CROSS-REFERENCE TO RELATED APPLICATIONS

This application is a Divisional of copending U.S. application Ser. No. 14/296,132 filed Jun. 4, 2014, which is a Divisional of copending U.S. application Ser. No. 14/113,985 filed on Oct. 25, 2013, which is the National Phase of PCT/JP2012/060557 filed on Apr. 19, 2012, which claims priority under 35 U.S.C. 119(a) to Patent Application No. 2011-099034 filed in Japan on Apr. 27, 2011, all of which are hereby expressly incorporated by reference into the present application.

TECHNICAL FIELD

The present invention relates to a thin display device and, for example, relates to a thin display device suitable for a liquid crystal television or the like and a tablet display device.

BACKGROUND ART

In recent years, televisions have become thinner and more lightweight, and as to relatively lightweight ones such as 20-inch ones, a plurality of portable types have been also released. In the case of the portable types, it is required to make much thinner and more lightweight and is further required to have a stylish shape compared to stationary types, so that a narrow frame region is also required.

For example, there is a technique to provide a molding and processing method capable of molding and processing an exterior cabinet for a thin display device with high accuracy easily (refer to Patent Literature 1). In this technique, metallic processing material in which parts corresponding to a frame portion and a cover portion of the exterior cabinet are formed along a longitudinal direction is cut in prescribed length. In addition, the part corresponding to the cover portion of the cut processing material is cut at plural points to form a V-shaped notch. The part opposing to the notch is processed to be bent to form the frame-shaped exterior cabinet.

CITATION LIST

Patent Literature

PATENT LITERATURE 1: Japanese Laid-Open Patent Publication No. 2010-266623

SUMMARY OF INVENTION

Technical Problem

In the meantime, a liquid crystal television generally has a configuration in which optical members such as a panel and an optical sheet are fixed by a metallic square frame called bezel in an enveloped manner, which is covered by a cabinet in many cases. However, in order to realize being thin, lightweight and a narrow frame region as described above, a configuration not in the frame configuration of the bezel as described above has been required.

Moreover, there is also a case where a portable TV which is relatively small has four corners of a product in a rounded shape to some extent from the viewpoint of the design, and in that case, it is necessary to make contrivance ensuring roundness of the corners while defining a bending angle of a frame accurately. In addition, in a portable TV, there is a case where a protection cover is attached on the surface for preventing break of a panel, and it is required to make contrivance preventing a gap when attaching the protection cover to a frame.

In the technique disclosed in Patent Literature 1, it is possible to create a frame of a television by making cuts in an extrusion molded product. However, there is a problem that it is impossible to ensure a bending angle while making predetermined bending R in a bending portion, and other techniques have been required.

The present invention has been made in view of the above situations, and an object thereof is to provide a technique solving the above problem.

Solution to Problem

A thin display device according to the present invention is provided with a metallic frame, wherein the frame is configured by connecting a plurality of frame members subjected to bending processing, in a part subjected to the bending processing, a hole portion for bending processing and two restricting means that restrict an amount of the bending processing to a predetermined amount by a V-Cut shape separation before the bending processing and by abutting each other at the time of processing are formed, and wherein the hole portion is configured as a long hole which is long in its longitudinal direction of the frame before the bending processing, and a part of the fringe of the long hole is configured as the V-cut shape separation.

Advantageous Effects of Invention

According to the present invention, it is possible to provide a technique related to a thin display device having a frame configuration in which accuracy is ensured.

BRIEF DESCRIPTION OF DRAWINGS

FIG. 7 is a plan view of the frame in a separated state according to the embodiment.

FIG. 8 is a side view of the frame in the separated state.

DESCRIPTION OF EMBODIMENTS

Next, description will hereinafter be given specifically for modes for carrying out the present invention with reference to drawings. The following explains as an example a liquid crystal television as a thin display device, however, of course, it is also possible to apply to a liquid crystal monitor and a mobile terminal (a mobile phone or a tablet display device).

A summary of the points of the present embodiment is as follows.

(1) A part corresponding to a cover portion of metallic processing material is cut out at the plural points. A part corresponding to a frame portion of the cut-out part is bent-processed, and an exterior cabinet (frame) in the form of a frame is molded using the processing material subjected to bending processing. The cut-out part has a part near the bending in a wide hole shape and has a part away from the bending in a shape adhered at the completion of bending so as to restrict a bending angle accurately.

(2) Predetermined uneven thickness is put on the part near the bending.

(3) There are two bending parts per one member.

(4) Connection of the members is performed through a connection member.

Figure 1:
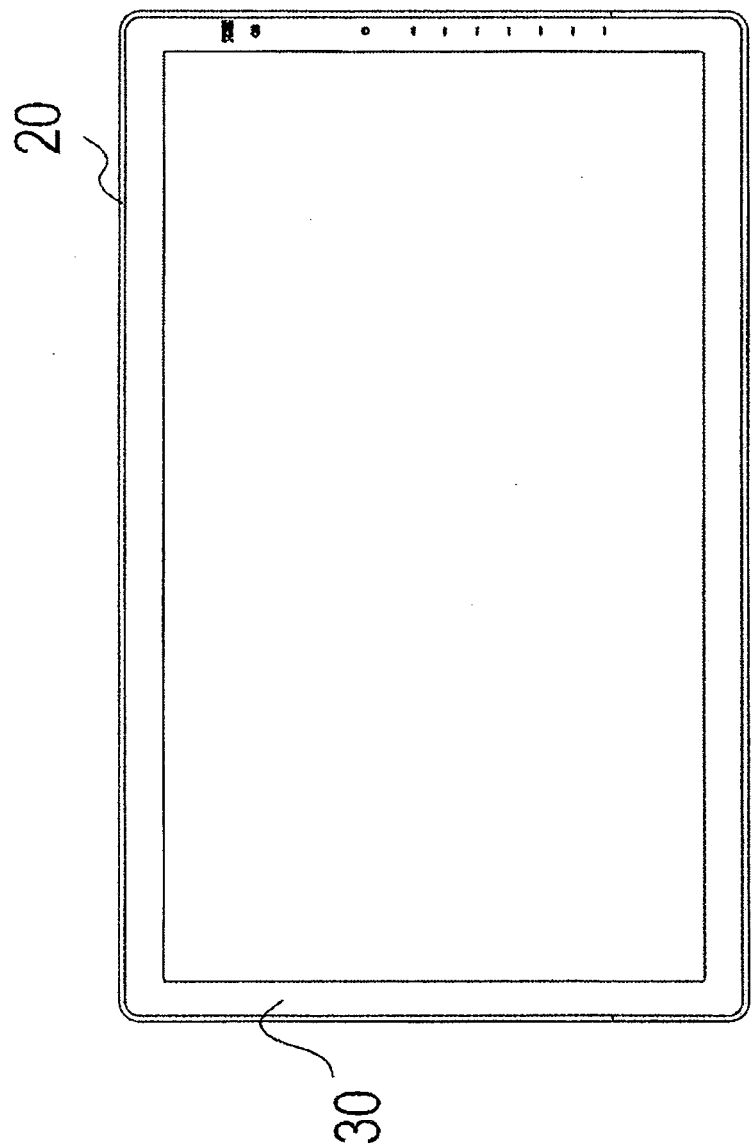
FIG. 1 is a plan view showing external view of a liquid crystal television according to an embodiment.
Figure 2:
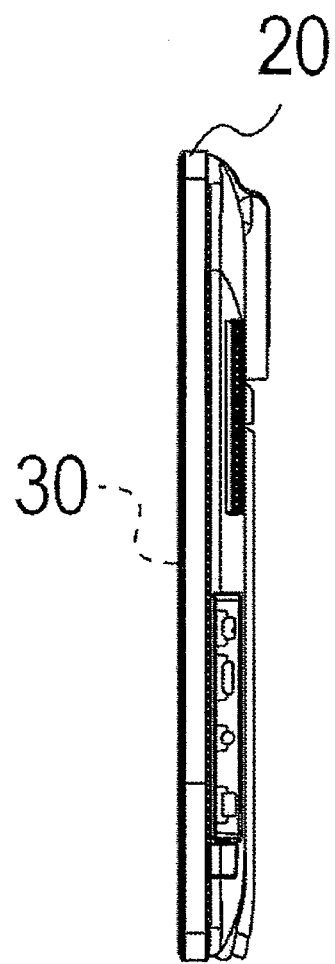
FIG. 2 is a side view showing external view of the liquid crystal television.
Figure 3:
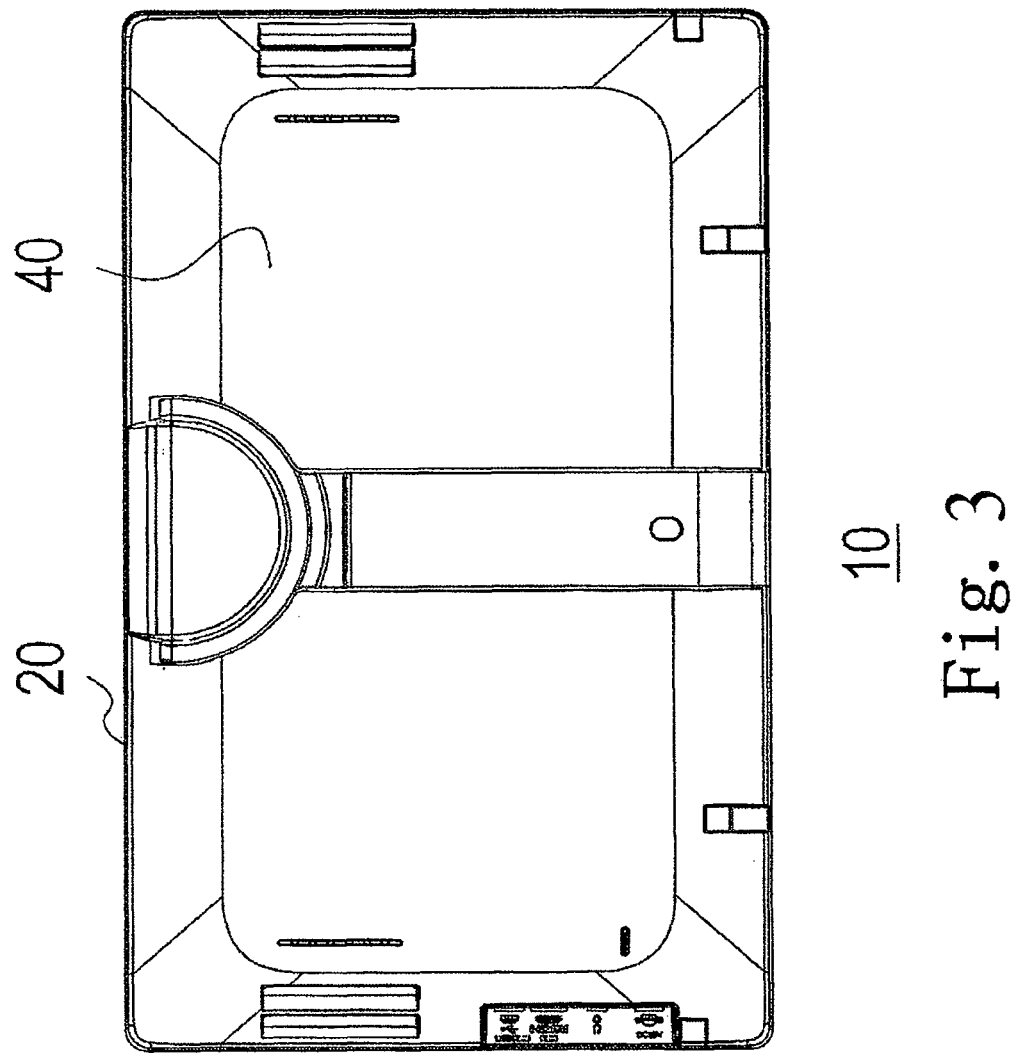
FIG. 3 is a rear view showing external view of the liquid crystal television.
Figure 4:
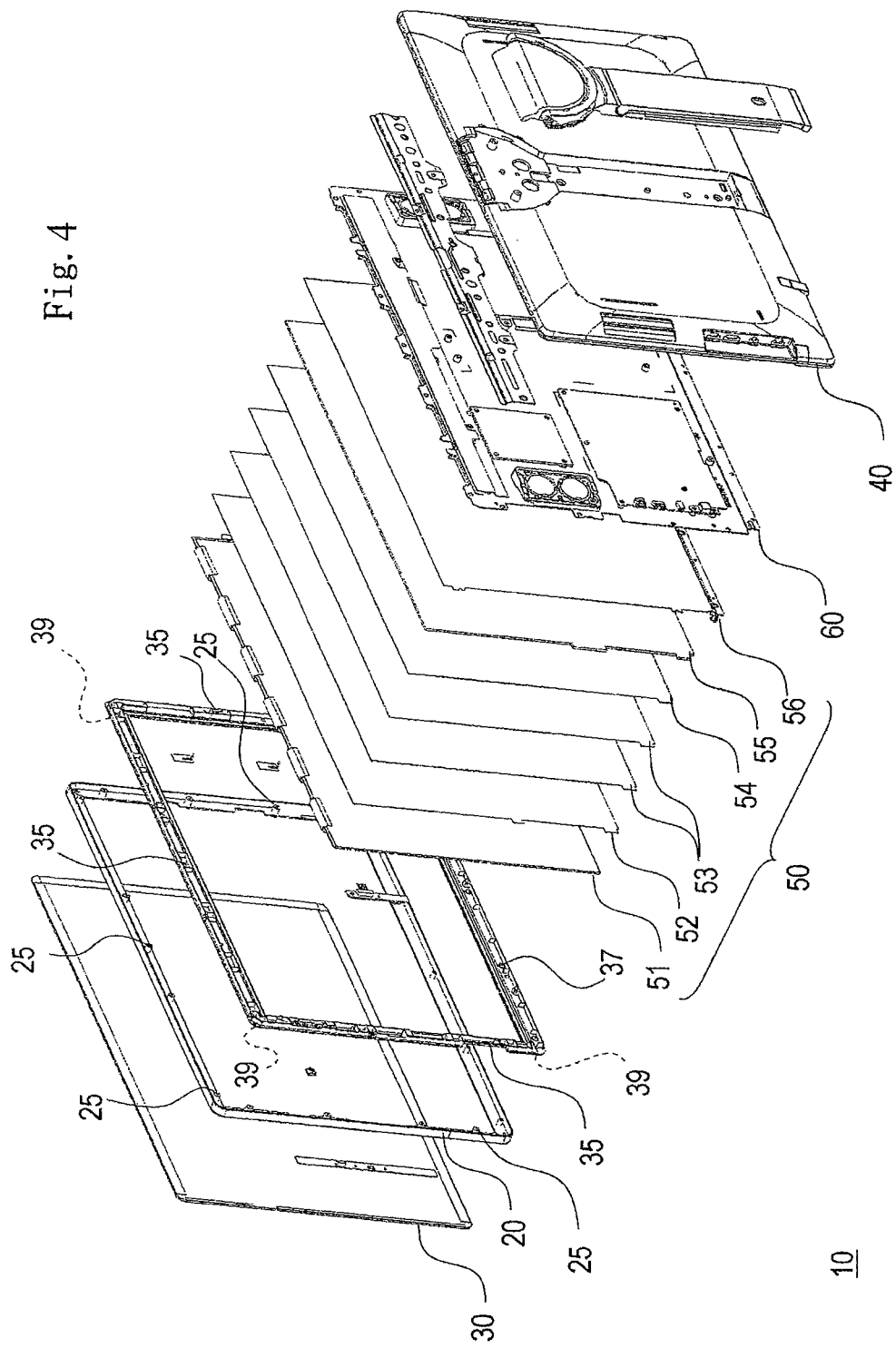
FIG. 4 is a disassembled perspective view showing external view of the liquid crystal television according to the embodiment.
Figure 5:
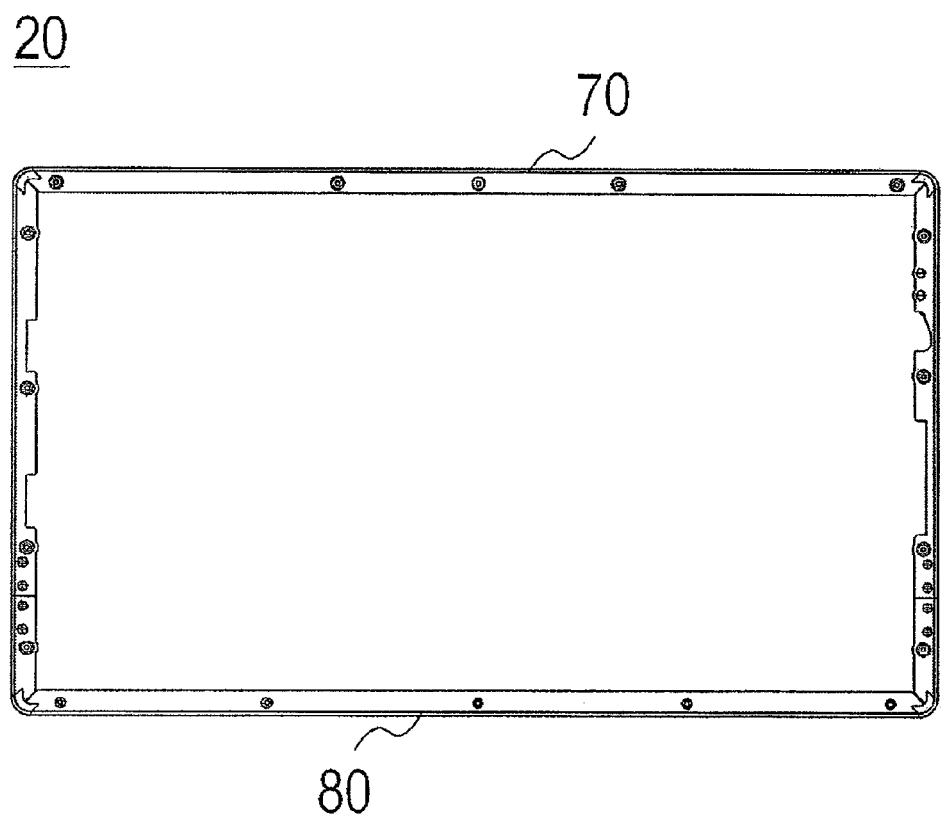
FIG. 5 is a plan view of a frame according to the embodiment.
Figure 6:
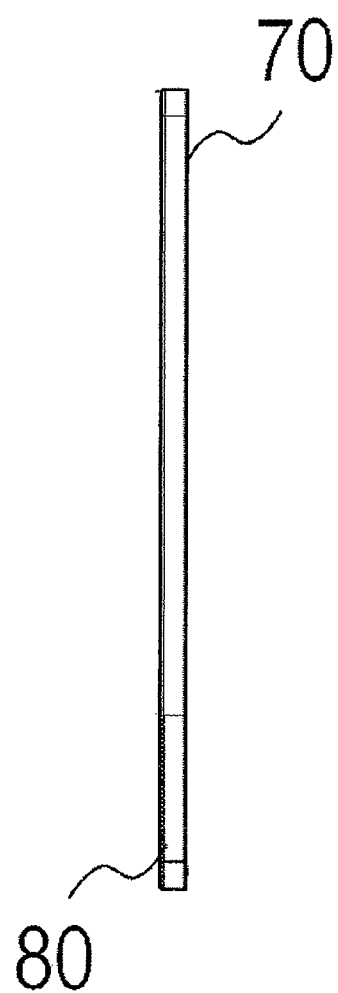
FIG. 6 is a side view of the frame.

FIGS. 1-3 are views showing external view of a liquid crystal television 10 according to the present embodiment. In addition, FIG. 4 is a disassembled perspective view of the liquid crystal television 10. The liquid crystal television 10 is provided with as an exterior a frame-shaped frame 20 which is an exterior side face cabinet, a transparent protection cover 30 in the front side, and a rear cabinet 40 in the rear side. In addition, inside the exteriors, a front cabinet 35, a sheet group 50 and a back light chassis 60 are arranged from the side of the transparent protection cover 30.

The frame 20 is a molded component by a metallic processing member (by processing extruded material or drawing material). Though description will be given below for the detailed configuration, for example, in the case of a 20-inch class, a rough size is about 490 mm width×about 290 mm height.

The transparent protection cover 30 is, for example, a glass plate and protects the sheet group 50. The rear cabinet 40 is molded with resin material.

The front cabinet frame 35 is molded with resin material to have the substantially same size and shape with the frame 20, and is attached to the rear face side of the frame 20. Note that, in the frame 20, a cylindrical positioning projection portion 25 is formed at a predetermined position to extend in a back direction. On the front face side of the front cabinet frame 35, a positioning boss hole 37 is provided corresponding to the positioning projection portion 25. Further, in four corners of the front face side of the front cabinet frame 35 (the frame 20 side), a fitting convex portion 39 fitting in a bending hole portion 83 of the frame 20, which will be described below, is provided.

The sheet group 50 has a liquid crystal panel 51, a Df sheet 52, a lens sheet 53, a light guide plate 54, a diffusion sheet 55, and a reflection plate 56 arranged in a laminated form from the front side.

The back light chassis 60 is such that a metallic plate-shaped body is processed to have a predetermined shape, in which a light source (for example, an LED edge light), a video driving circuit, a battery and the like, which are not shown, are arranged.

Subsequently, description will be given specifically for the frame 20 which is characteristic to the present embodiment.

Figure 9:
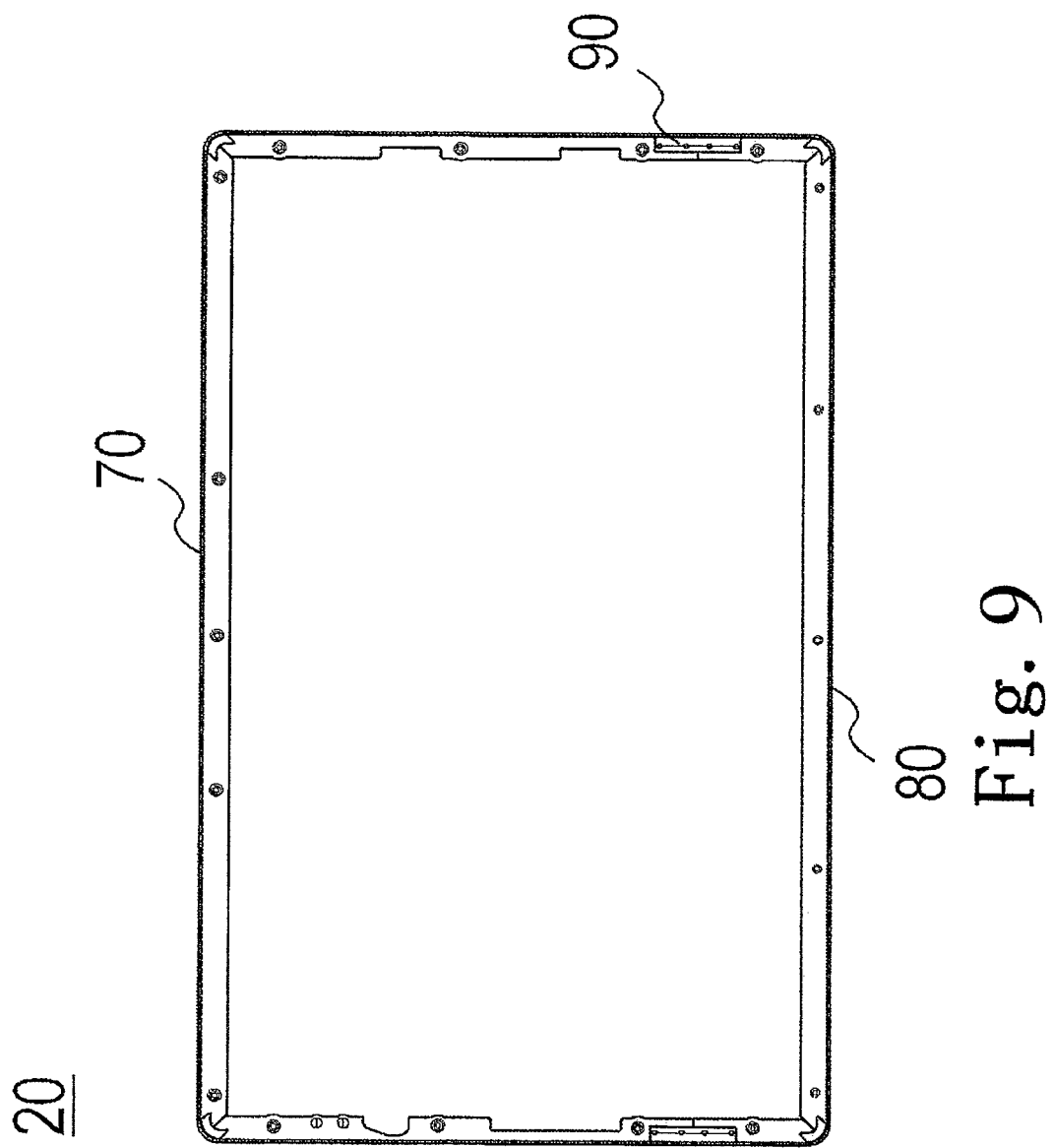
FIG. 9 is a rear view of the frame according to the embodiment.
Figure 10:
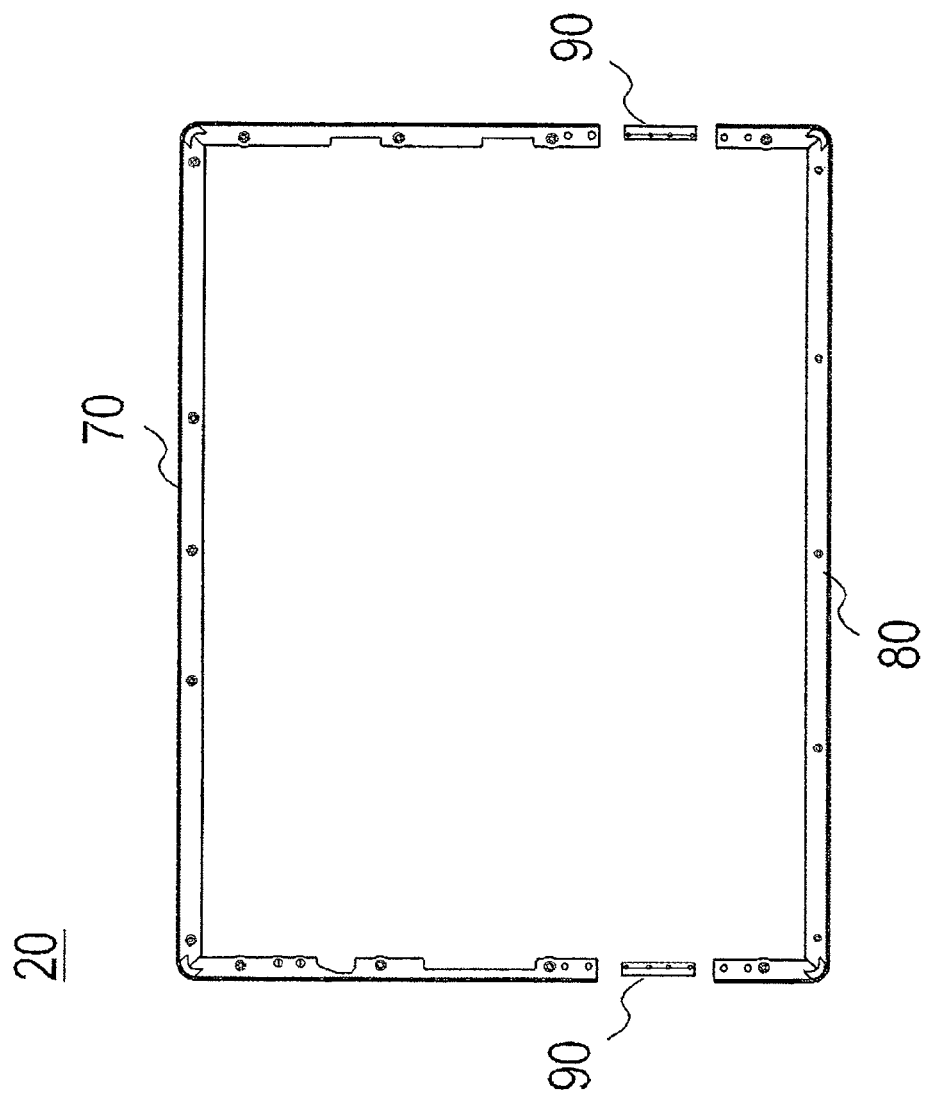
FIG. 10 is a rear view of the frame in the separated state.

FIGS. 5 and 6 and FIGS. 7 and 8 show plan views (FIG. 5 and FIG. 7) and side views (FIG. 6 and FIG. 8) of the frame 20. Note that, FIGS. 7 and 8 show a state where the frame 20 is separated. Moreover, FIGS. 9 and 10 show rear views of the frame 20.

As illustrated, the frame 20 is configured by a first frame 70 and a second frame 80, which are connected by a connection member 90. Specifically, the first frame 70 in the upper side and the second frame 80 in the lower side are connected integrally by the connection member 90 at two points of the both side faces of the rear face part.

Each of the first frame 70 and the second frame 80 is molded from an extruded member (which may be a drawing member) such as aluminum alloy or stainless steel. Specifically, in order to allow the parts corresponding to the four corners (hereinafter, referred to as corner portions) to be bent, the frame 20 of the extruded material in a predetermined cross-sectional shape is subjected to the processing of the predetermined cut-out shape, and is further subjected to bending processing with R of the predetermined size.

Figure 11:
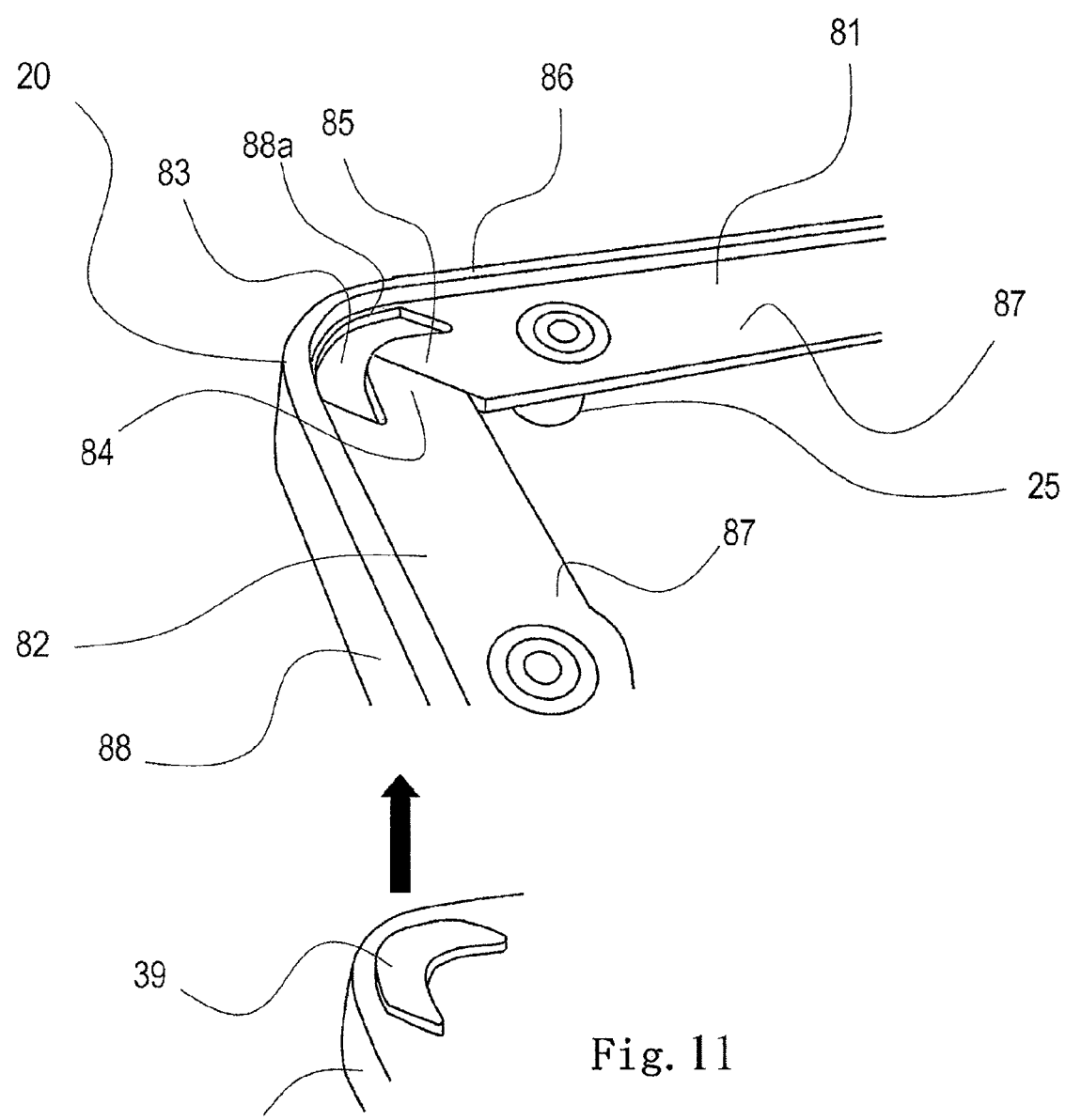
FIG. 11 is a perspective view of a corner portion of the frame according to the embodiment.
Figure 12:
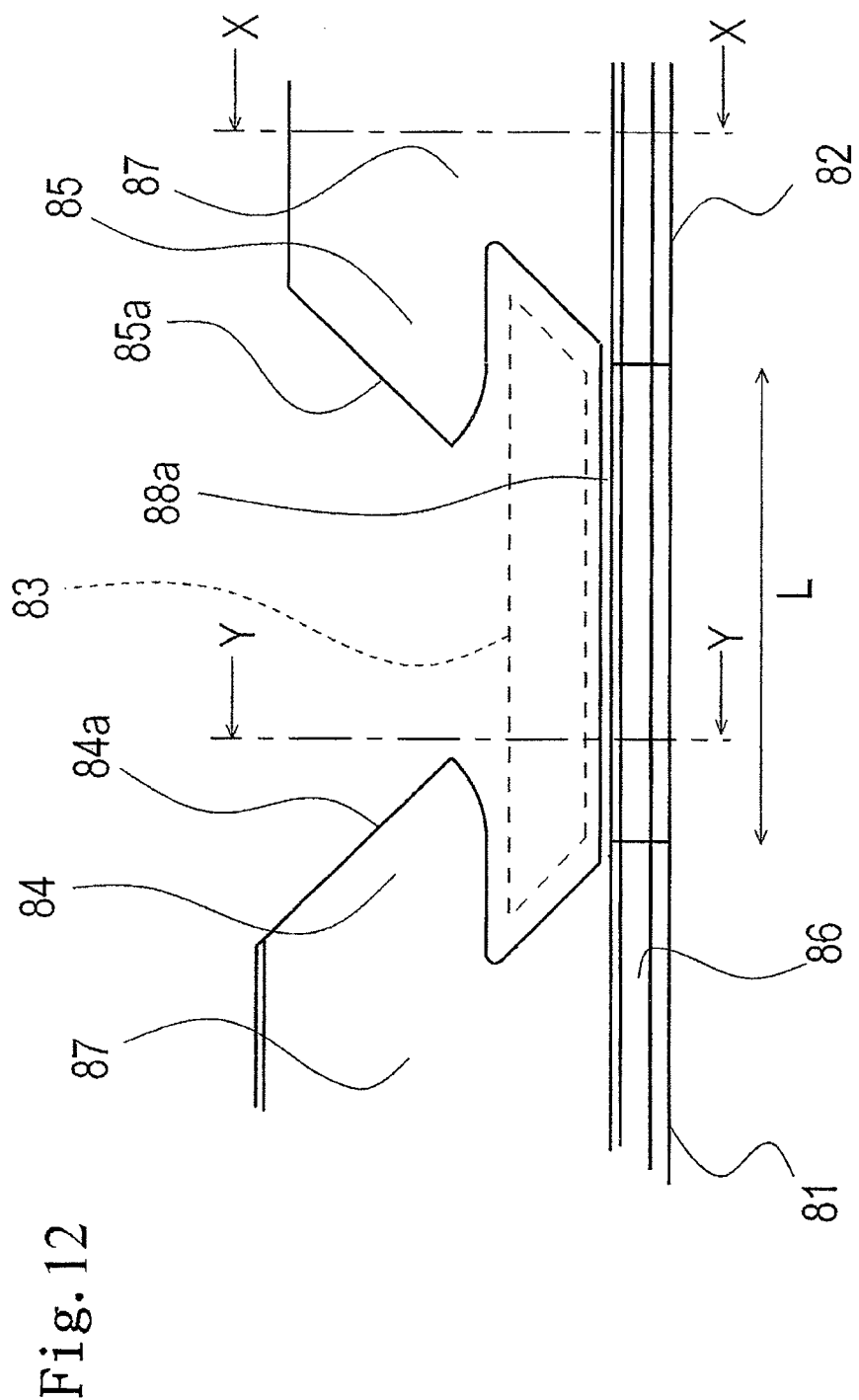
FIG. 12 is a detailed plan view of the corner portion of the frame according to the embodiment.
Figure 13:
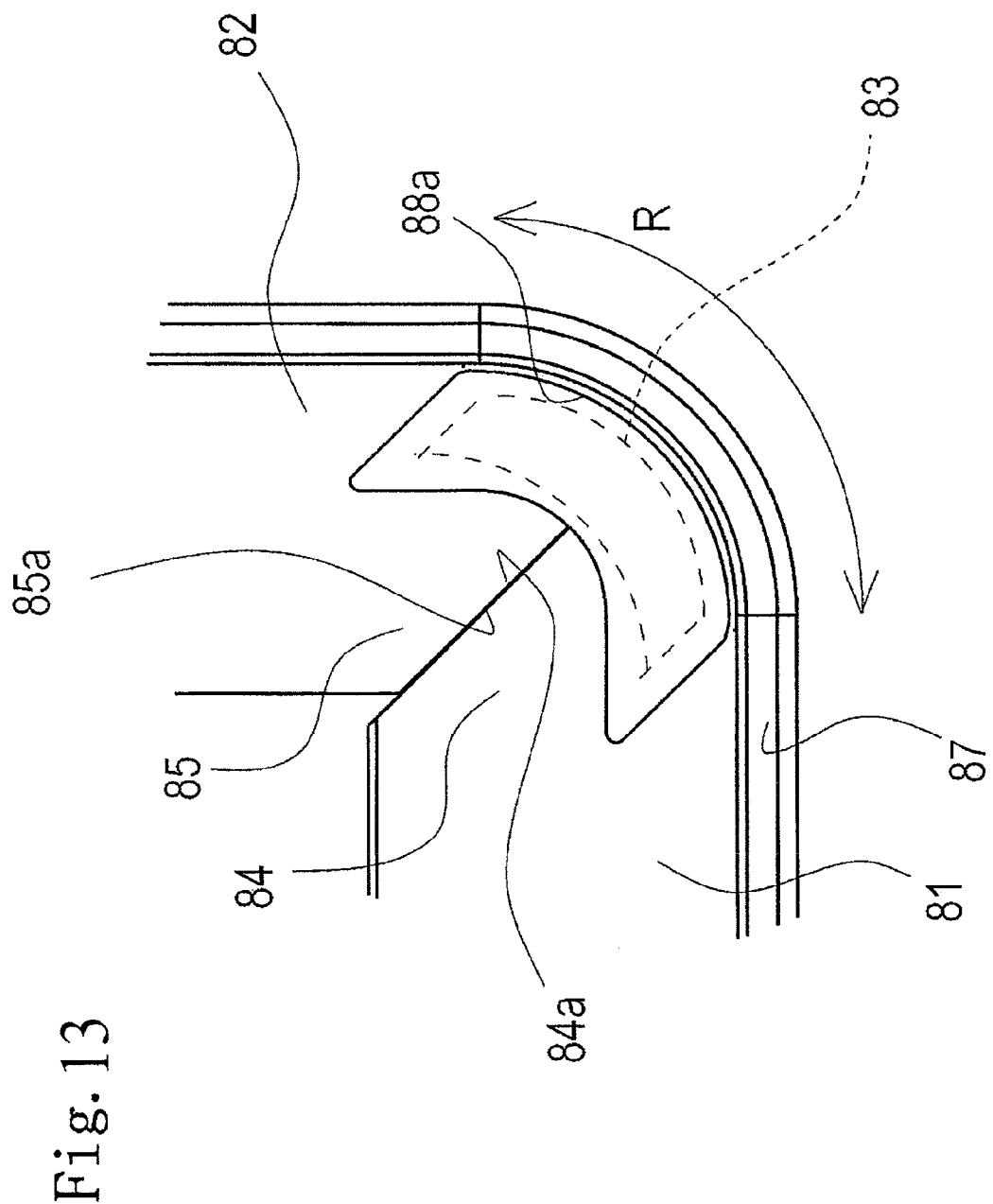
FIG. 13 is a detailed cross-sectional view of the corner portion of the frame.
Figure 14:
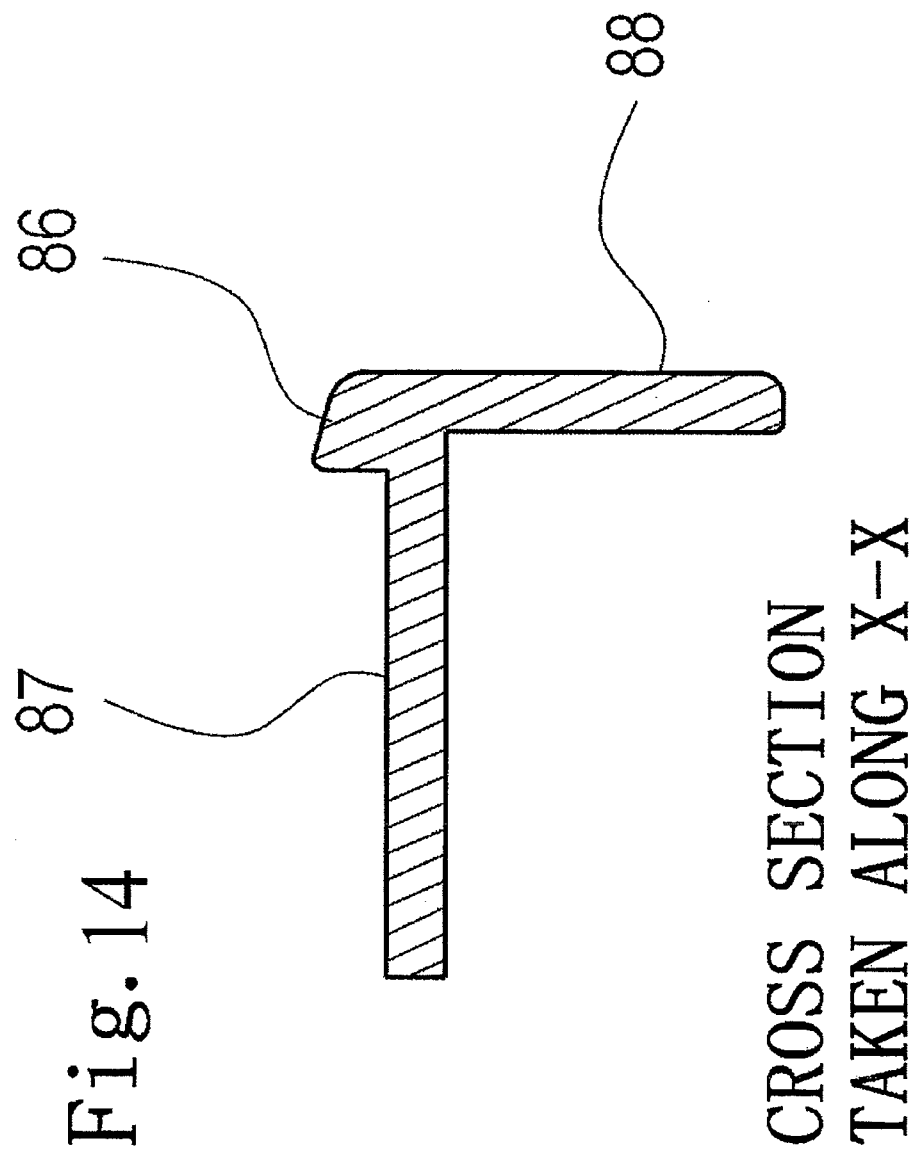
FIG. 14 is a cross-sectional view taken along X-X of FIG. 12.
Figure 15:
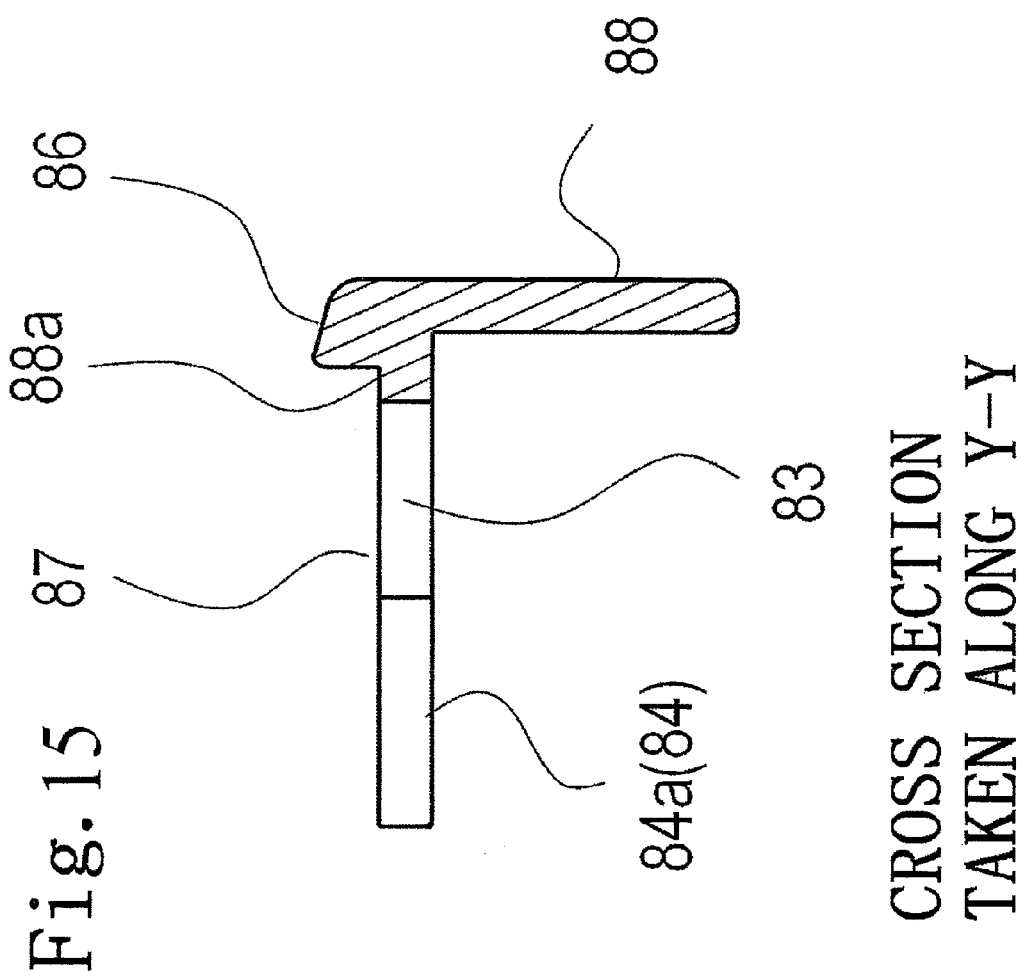
FIG. 15 is a cross-sectional view taken along Y-Y of FIG. 12.
Figure 16:
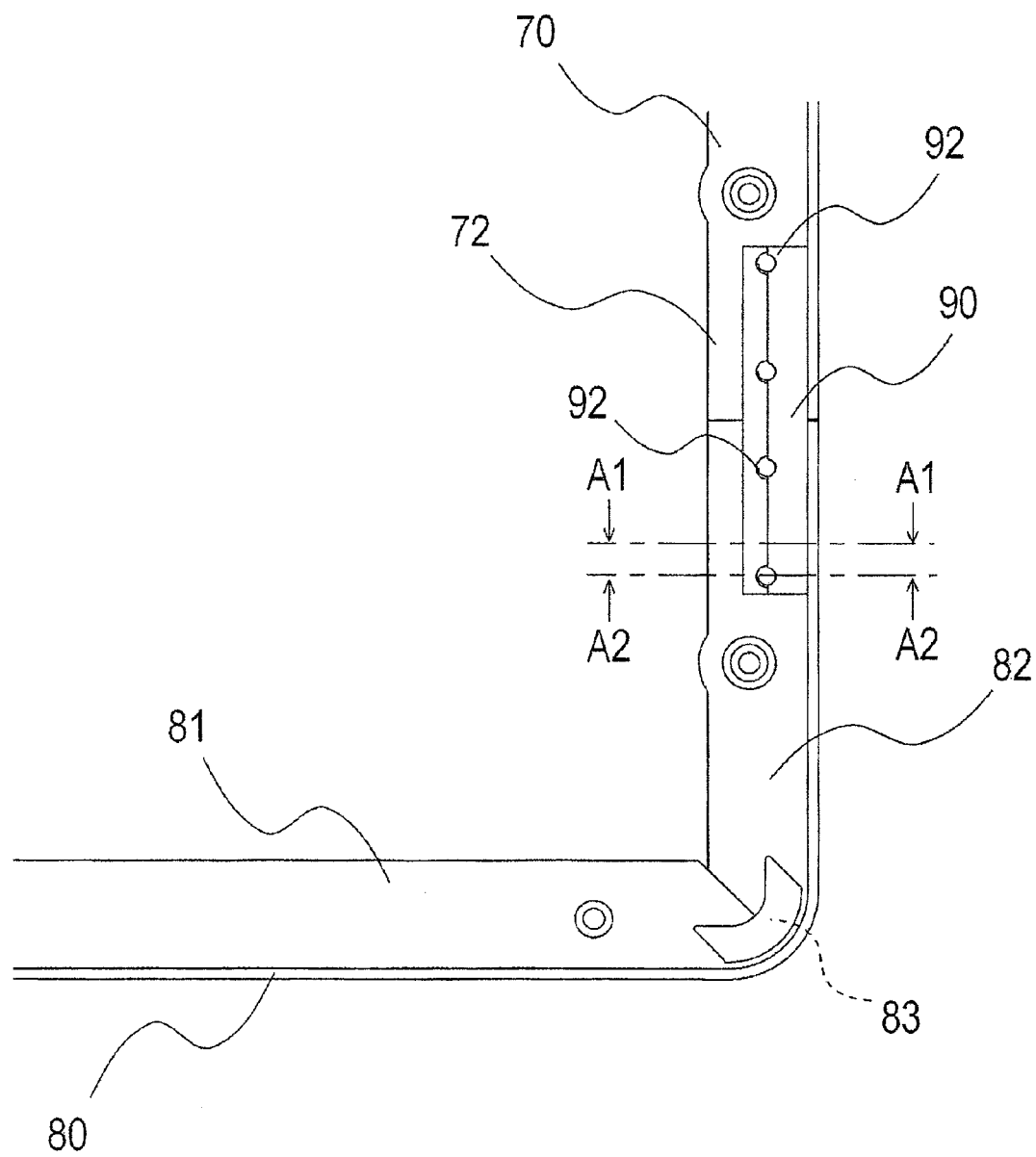
FIG. 16 is a view of a rear face side of the corner portion of the frame according to the embodiment.
Figure 17:
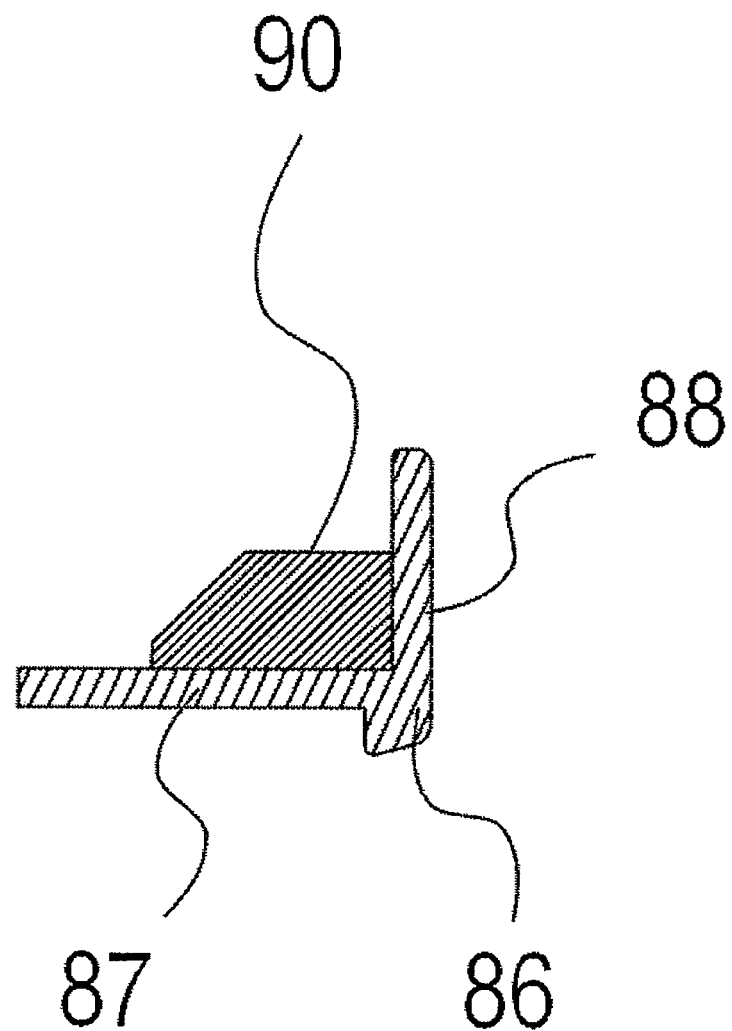
FIG. 17 is a cross-sectional view taken along A1-A1 of FIG. 16.
Figure 18:
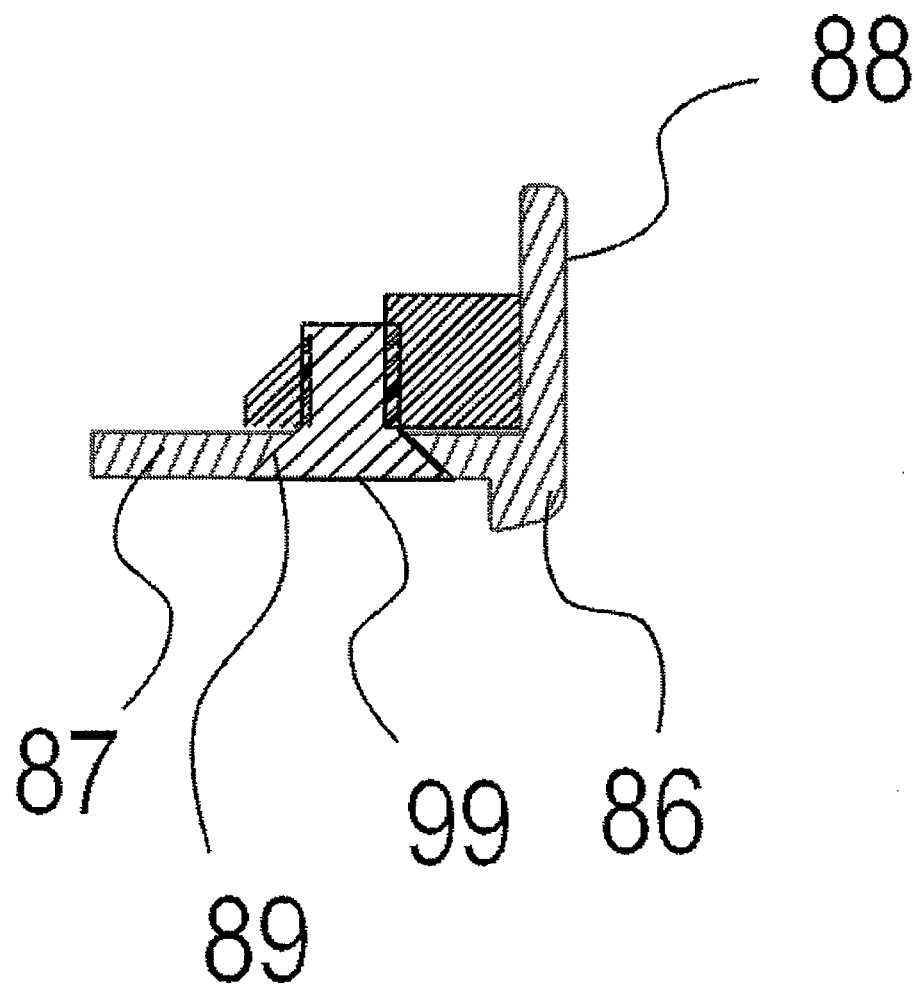
FIG. 18 is a cross-sectional view taken along A2-A2 of FIG. 16.

An enlarged perspective view of the corner portion is shown in FIG. 11. Since the four corners all have the same shape, the bending part of the first frame 70 and the bending part of the second frame 80 have substantially the same shape, so that description will be given below mainly for the second frame 80 as a representative, if not otherwise specified. Moreover, FIG. 12 shows the state of the corner portion before bending processing, and FIG. 13 shows the state of the corner portion after the processing. In addition, FIG. 14 shows a cross-sectional view taken along X-X of FIG. 12 and FIG. 15 shows a cross-sectional view taken along Y-Y of FIG. 12.

In the second frame 80, the extruded material of aluminum alloy is firstly cut in the predetermined length according to a size of the liquid crystal television 10. The cross-sectional shape is configured by a protection cover arranging portion 87 (a front face part of a bottom portion 81 and a side portion 82) on which the transparent protection cover 30 is arranged, an outer peripheral projection portion 86 that is in a projected state to be one-step higher than the protection cover arranging portion 87 in the outer peripheral part, and a frame side face portion 88 that is exposed as a side face of the liquid crystal television 10. In other words, the shape is not an L-shape but a T-shape (the state being set down on its side). The outer peripheral projection portion 86 is set according to thickness of the transparent protection cover 30 and, for example, has about 1.5 mm height.

Subsequently, in the second frame 80, a shape corresponding to the corner portion (the bending hole portion 83, and first and second restricting convex portions 84 and 85, which will be described below) and a frame side screw hole 99 are formed. In the state before bending processing of FIG. 12, the bending hole portion 83 takes a substantially inverted trapezoidal shape. The height of the inverted trapezoid (distance from a light leakage prevention deep portions 88*a* to the first and second restricting convex portions 84 and 85) is around 10 mm. Further, the length L of a lower side of the inverted trapezoid is set to be the same as (or slightly longer than) the length corresponding to R of the bending portion. This is for enabling the bending processing appropriately and easily.

Moreover, when the transparent protection cover 30 is arranged in the bending hole portion 83 subjected to cutting-out processing, in order to prevent light leakage of the inside of the liquid crystal television 10, the light leakage prevention deep portion 88*a* the predetermined size of which is remained being unprocessed is provided. Note that, after the second frame 80 is subjected to the bending processing, the left-side part of the bending hole portion 83 serves as a bottom front face portion 81 extending horizontally and a right-side part thereof serves as a side portion 82 extending vertically.

Further, in an inner part of the bending hole portion 83 (upper-side part of FIG. 12), the first restricting convex portion 84 and the second restricting convex portion 85 are formed. Specifically, the first restricting convex portion 84 extends from the bottom front face portion 81 toward the bending hole portion 83. Similarly, the second restricting convex portion 85 extends from the side portion 82 toward the bending hole portion 83. At this time, a restricting face 84*a* which is an end portion of the first restricting convex portion 84 takes an angle of 45 degrees sloping from upper left to lower right. A restricting face 85*a* which is an end portion of the second restricting convex portion 85 takes an angle of 45 degrees sloping from upper right to lower left. That is, a front end of the V-cut shape becomes a large hole (bending hole portion 83). In addition, in the front cabinet frame 35, a convexed fitting convex portion 39 that has substantially the same shape with the shape of the bending hole portion 83 with a size to be just fit therein is formed at the position corresponding to the bending hole portion 83, that is, in the four corners in the front face side. The height of the fitting convex portion 39 is set so as to be lower than the top face of the frame 20 (the face of the protection cover arranging portion 87) in the case of being fit. Also with this configuration, positioning and misalignment prevention are performed reliably.

In addition, as shown in FIG. 13, when the bending processing is carried out, the restricting face 84*a* of the first restricting convex portion 84 and the restricting face 85*a* of the second restricting projection portion 85 are abut. With this abutting, the bottom front face portion 81 and the side portion 82 form a right angle so as not to be bent any more. That is, it is possible to perform the bending processing with high accuracy, and distortion will not be caused even after the first frame 70 and the second frame 80 are assembled.

FIGS. 16-18 and FIGS. 19 and 20 show a detailed assembling part of the first frame 70 and the second frame 80. The first frame 70 and the second frame 80 are connected by the connection member 90 at each of a rear face part thereof. In a side portion 72 of the first frame 70 and a side portion 82 of the second frame 80, two frame side screw holes in each of which, or four frame side screw holes 79*a*, 79*b*, 89*a* and 89*b* in total, are formed. Note that, the two frame side screw holes 79*a* and 79*b* are simply represented as a frame side screw hole 79 when not distinguished. Similarly, the two frame side screw holes 89*a* and 89*b* are simply represented as a frame side screw hole 89 when not distinguished. The frame side screw holes 79*a*, 79*b*, 89*a* and 89*b* are formed into the partially conical shape corresponding to a flat head screw 99.

Figure 19:
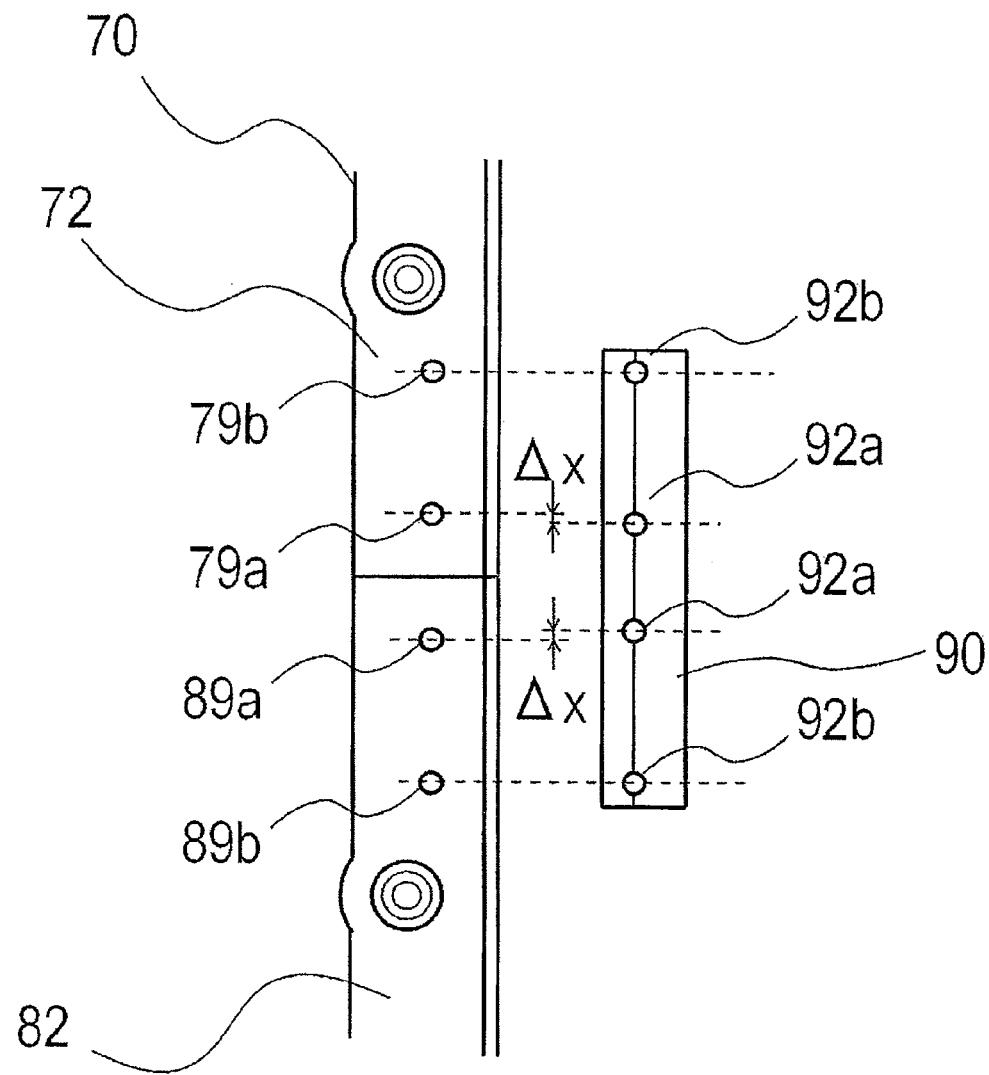
FIG. 19 is a rear view of the frame and a connection member according to the present embodiment.
Figure 20:
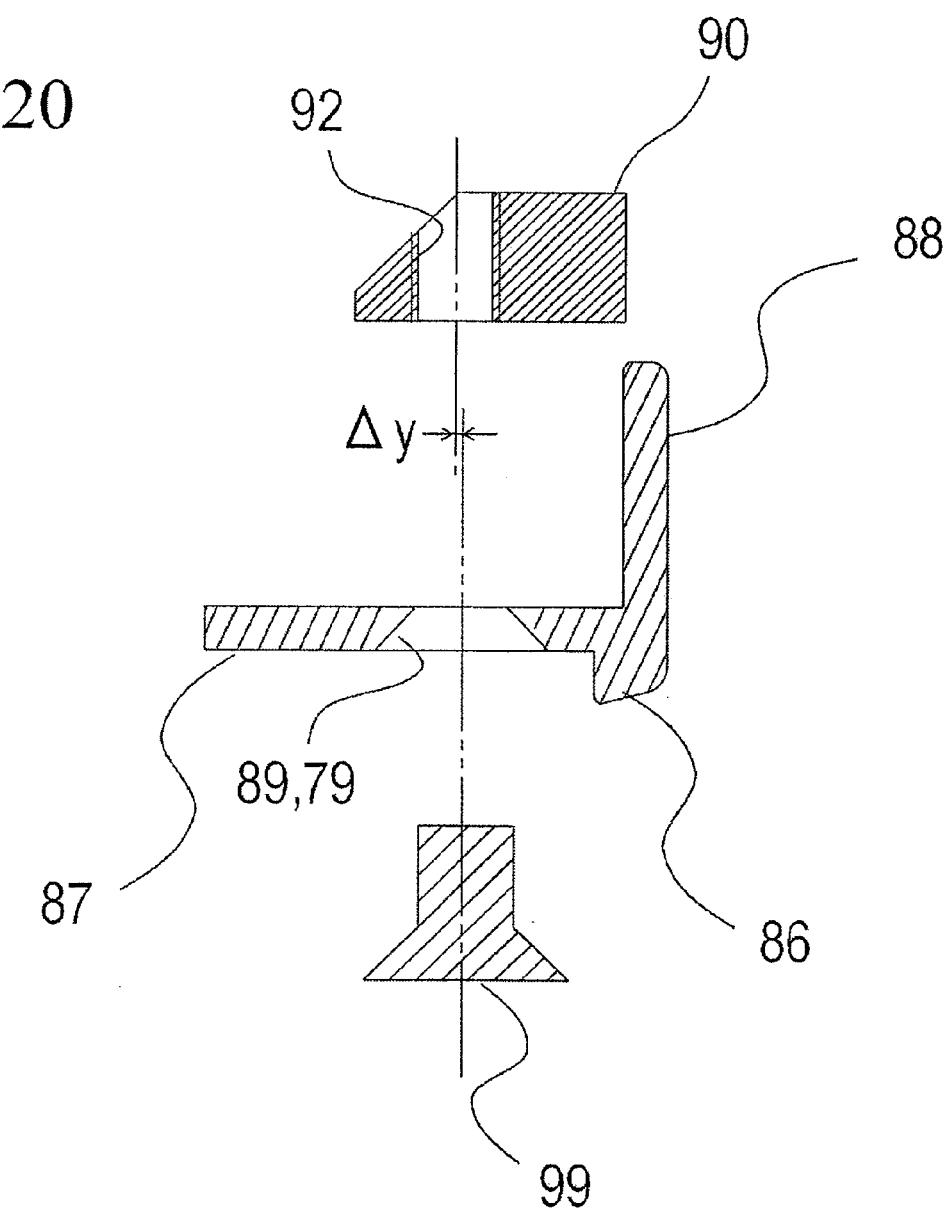
FIG. 20 is a cross-sectional view of the frame and the connection member.

The connection member 90 is obtained by processing, for example, plate material of aluminum alloys or the like, in which four connection member side screw holes 92*a* and 92*b* (simply represented as connection member side screw holes 92 when not otherwise distinguished) are formed in total at the positions corresponding to the frame side screw holes 79 and 89. Here, as shown in FIG. 19, to the inside two connection member side screw holes 92*a*, an offset ΔX is set to the frame side screw holes 79*a* and 89*a* so as to slightly approach the illustrated vertical direction, respectively. The offset ΔX is, for example, around from 0.05 mm to 0.10 mm. Moreover, as shown in FIG. 20, even for the width direction, a predetermined offset ΔY is set to the frame side screw holes (79*a* and 79*b*) and 89 (89*a* and 89*b*) and the connection member side screw holes 92, so that force acts in a direction that the connection member 90 is pressed against the side portion 82 of the second frame 80.

Accordingly, when the first frame 70 and the second frame 80 are fastened by the connection member 90, with the above offsets ΔX and ΔY, force acts on the first frame 70 and the second frame 80 in a direction approaching each other. Thus, it is possible to correct a state where restoring force acts on each part of each bending of the first frame 70 and the second frame 80 to a direction that an end opens, and to maintain the assembled state of the frame 20 appropriately.

Now, a summary of effects of the present embodiment is summarized as follows.

It is possible to generate predetermined R at a bending part of the frame 20 easily as well as to align to the predetermined bending angle accurately. In addition, when the transparent protection cover 30 is directly attached on the frame 20, by a thickly raised part of the corner part (the light leakage prevention deep portion 88*a*), space which allows to visually recognize the inside disappears between the transparent protection cover 30 and the frame 20 so that components under the frame 20 is not able to be seen. That is, it is possible to put a blindfold without using additional components other than the frame 20. When the frame 20 is made, the configuration is such that two members in the almost symmetrical shape are fixed, so that force is brought to four corners uniformly. As a result, it is possible to reduce deformation of a product. Adjustment of the connection member 90 of a joint portion makes it possible to ensure accuracy of the square frame.

Hereinabove, the present invention has been described on the basis of the embodiment. This embodiment provides only an exemplification, and any person with an ordinary skill in the art could understand that, by combining each of the components thereof, various modified examples can be made, and such modified examples are also within the scope of the present invention.

Figure 21:
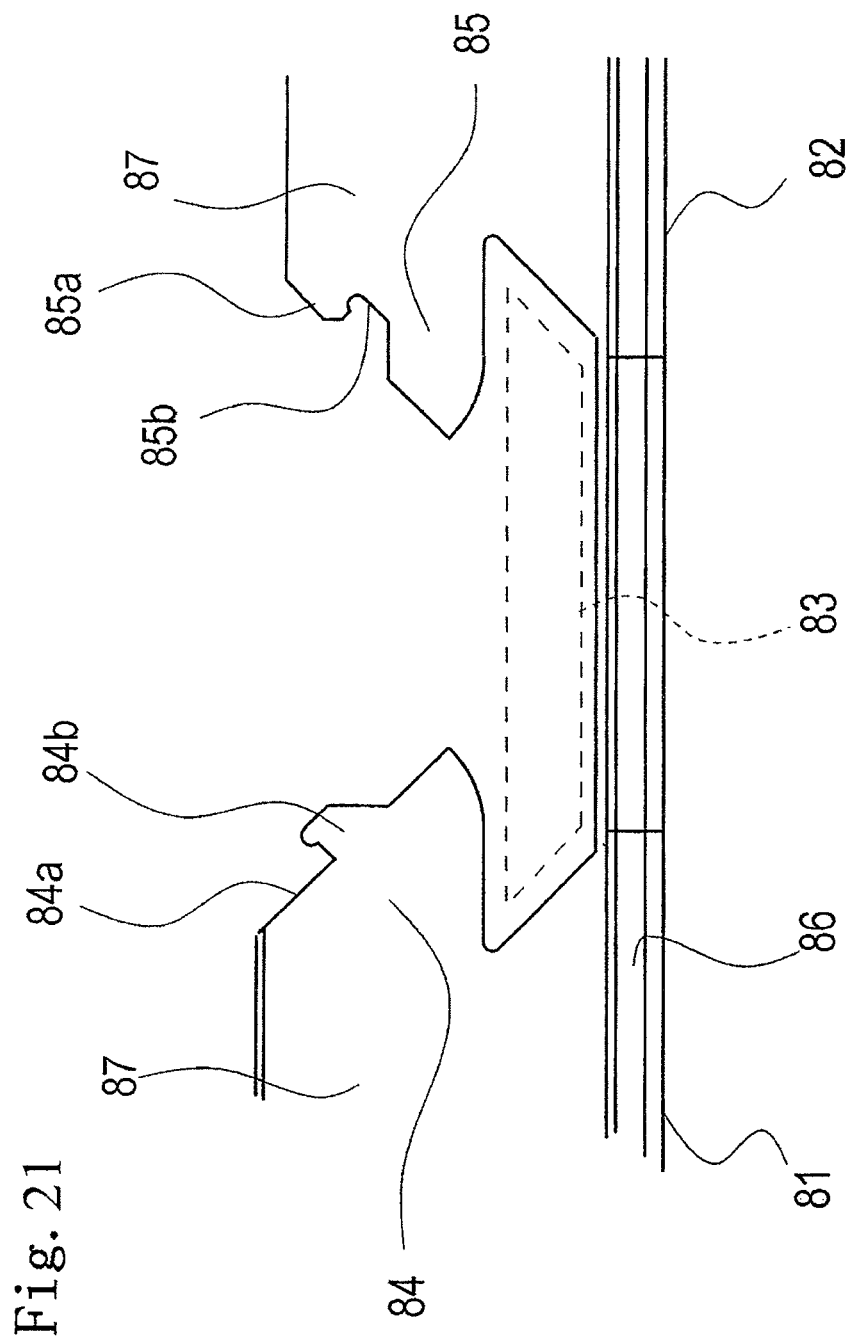
FIG. 21 is a plan view of the corner portion of the frame according to a modified example of the embodiment.
Figure 22:
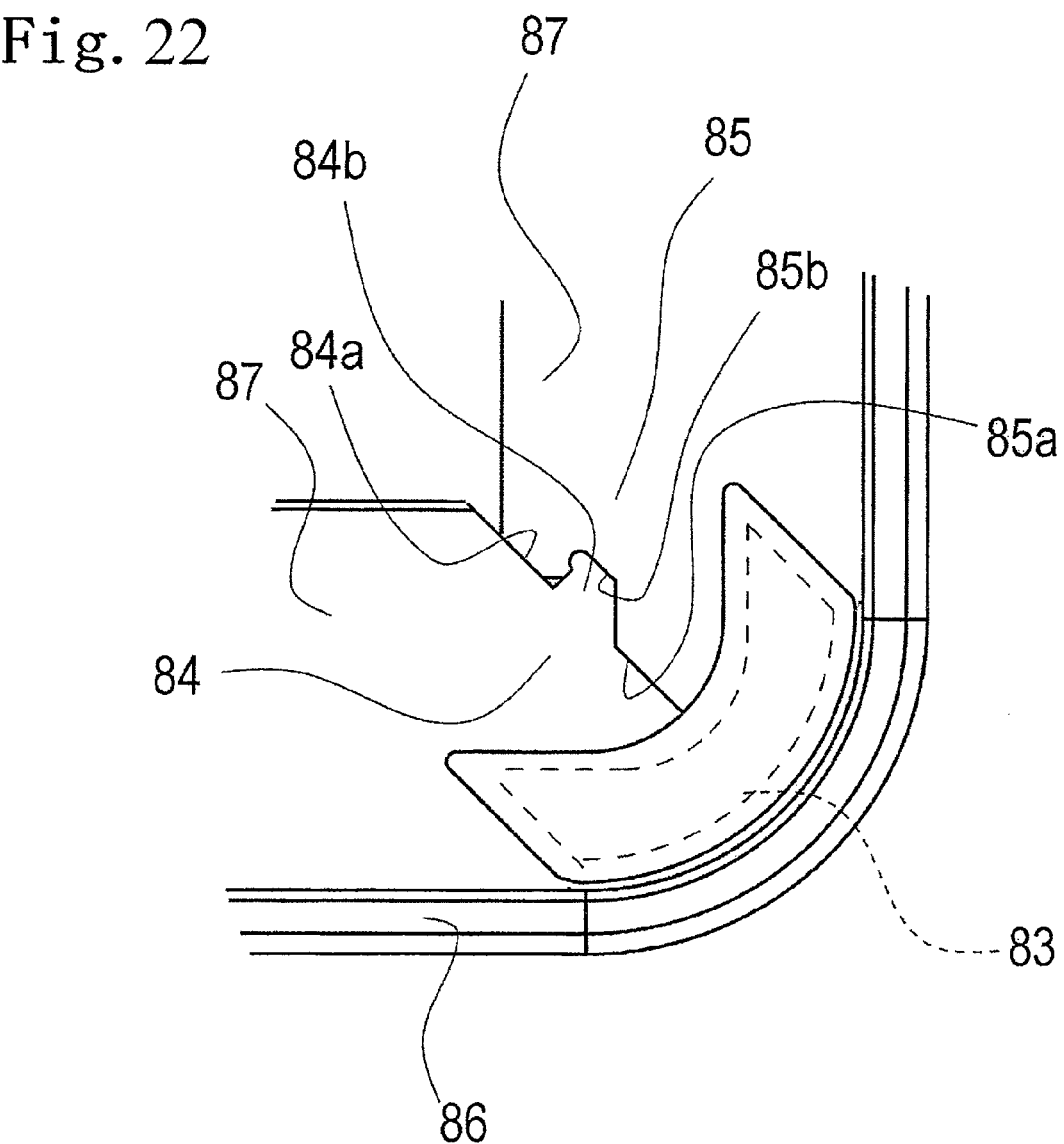
FIG. 22 is a plan view of the corner portion of the frame after bending process.

FIGS. 21 and 22 show plan views of the corner portion of the second frame 80 according to a modified example, and specifically, FIG. 21 shows a state before bending processing of the corner portion and FIG. 22 shows a state of the corner portion after processing. As illustrated, a fitting convex portion 84b is formed on the restricting face 84a of the first restricting convex portion 84. Moreover, a fitting concave portion 85b is formed on the restricting face 85a of the second restricting convex portion 85. It is configured such that, when the bending processing is performed, the fitting convex portion 84b and the fitting concave portion 85b are just fit. Further, in order to maintain the fitting state, an engaging piece is formed on the fitting convex portion 84b and an engaging concave portion which is engaged with the engaging piece is formed on the fitting concave portion 85b. Here, as illustrated, the engaging piece has a semicircular convex shape in plan view and the engaging concave portion has a semicircular concave shape.

In this manner, with the configuration having a function of engaging when the first restricting convex portion 84 and the second restricting convex portion 85 are subjected to the bending processing, it is possible to add force against restoring force (counter restoring force) which acts on each part of each bending of the first frame 70 and the second frame 80. As a result, the configuration against the above restoring force by the connection member 90 is able to be made small, and therefore degree of flexibility in arranging components is improved. Moreover, fitting of the fitting convex portion 84b and the fitting concave portion 85b makes it possible to improve accuracy of the bending processing of the second frame 80 and the like. In addition, by fitting, it is possible to maintain the processing shape appropriately when external force is brought to the second frame 80.

Figure 23:
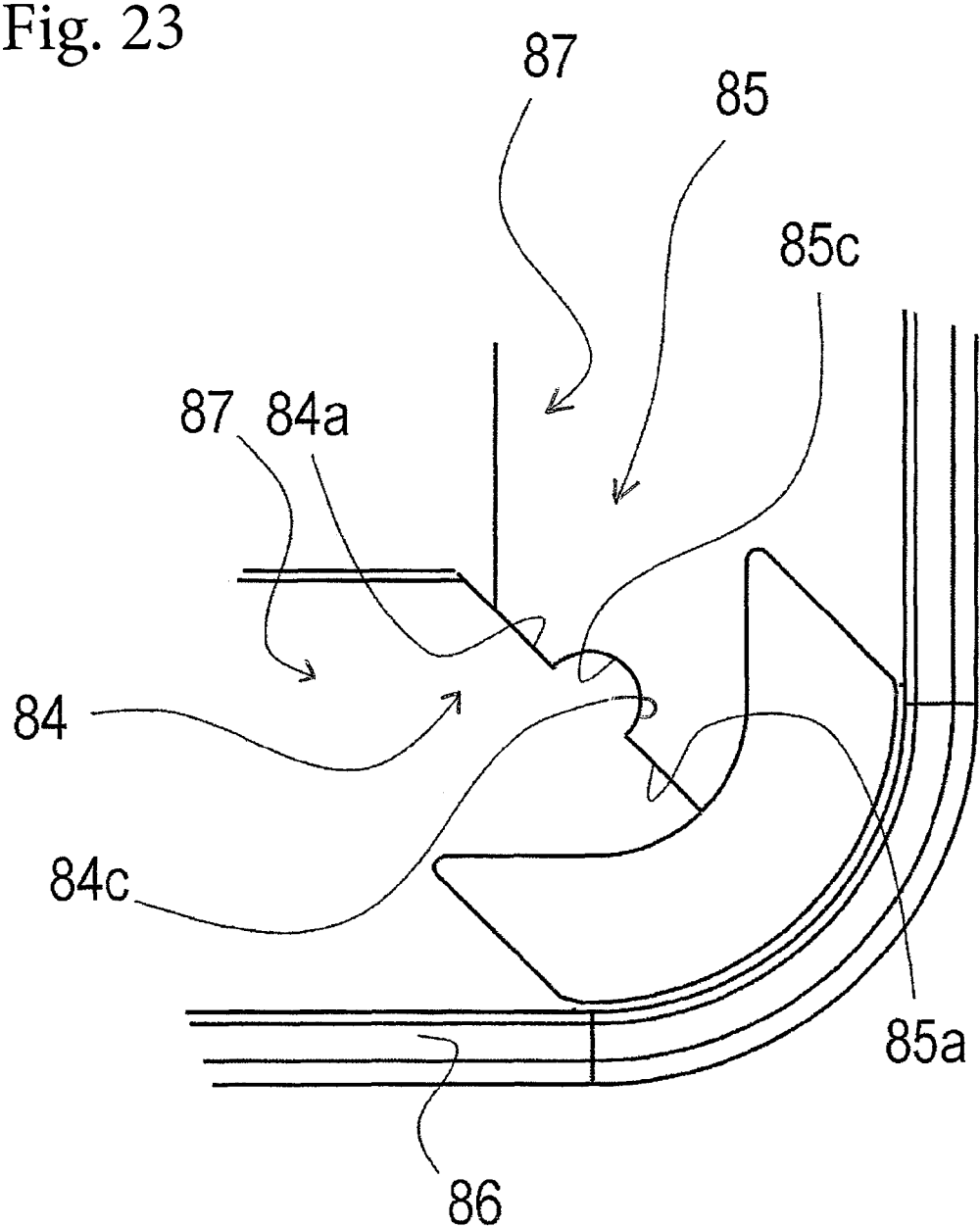
FIG. 23 is a plan view of the corner portion of the frame according to a modified example of the embodiment.
Figure 24:
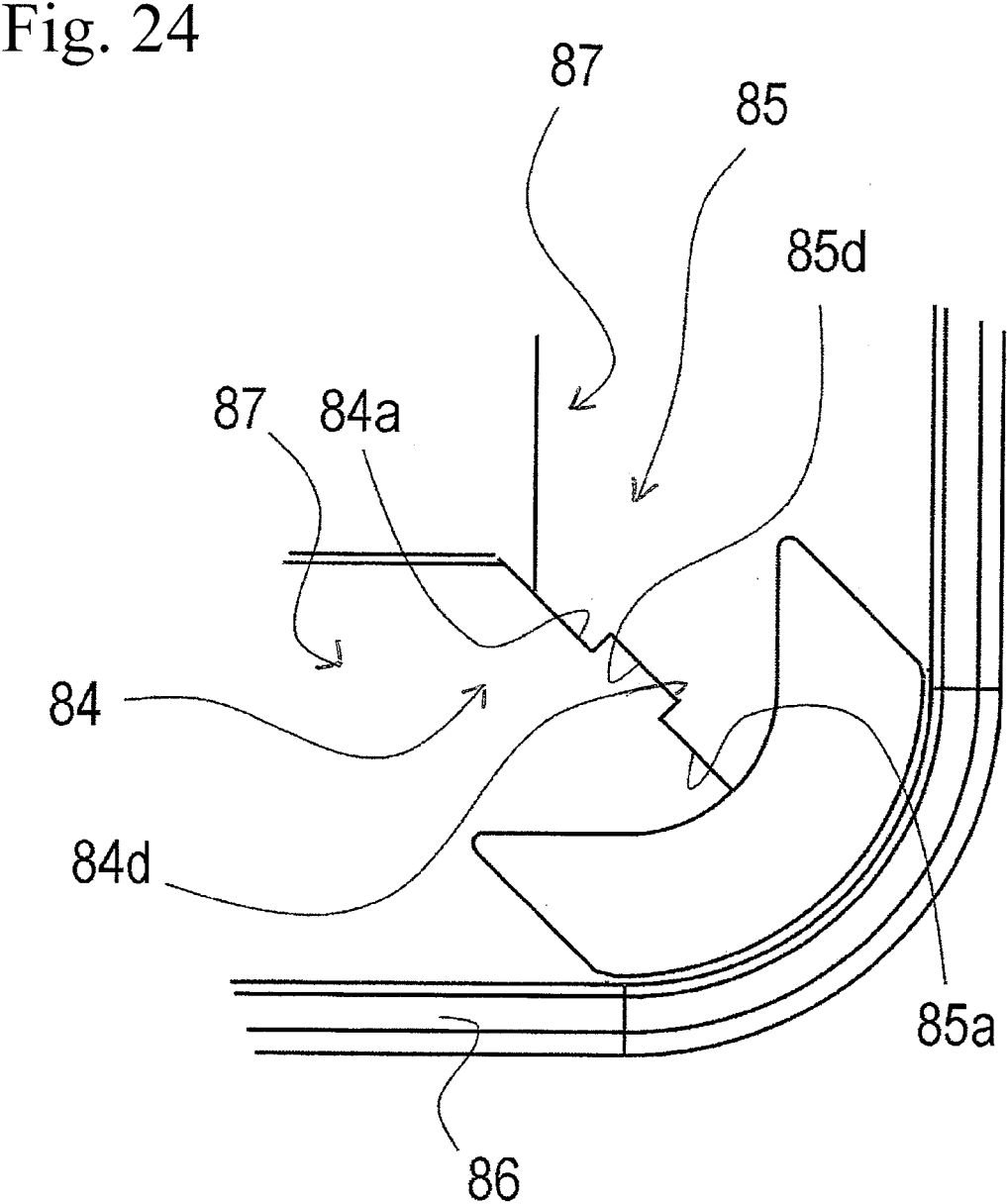
FIG. 24 is a plan view of the corner portion of the frame according to another modified example.
Figure 25:
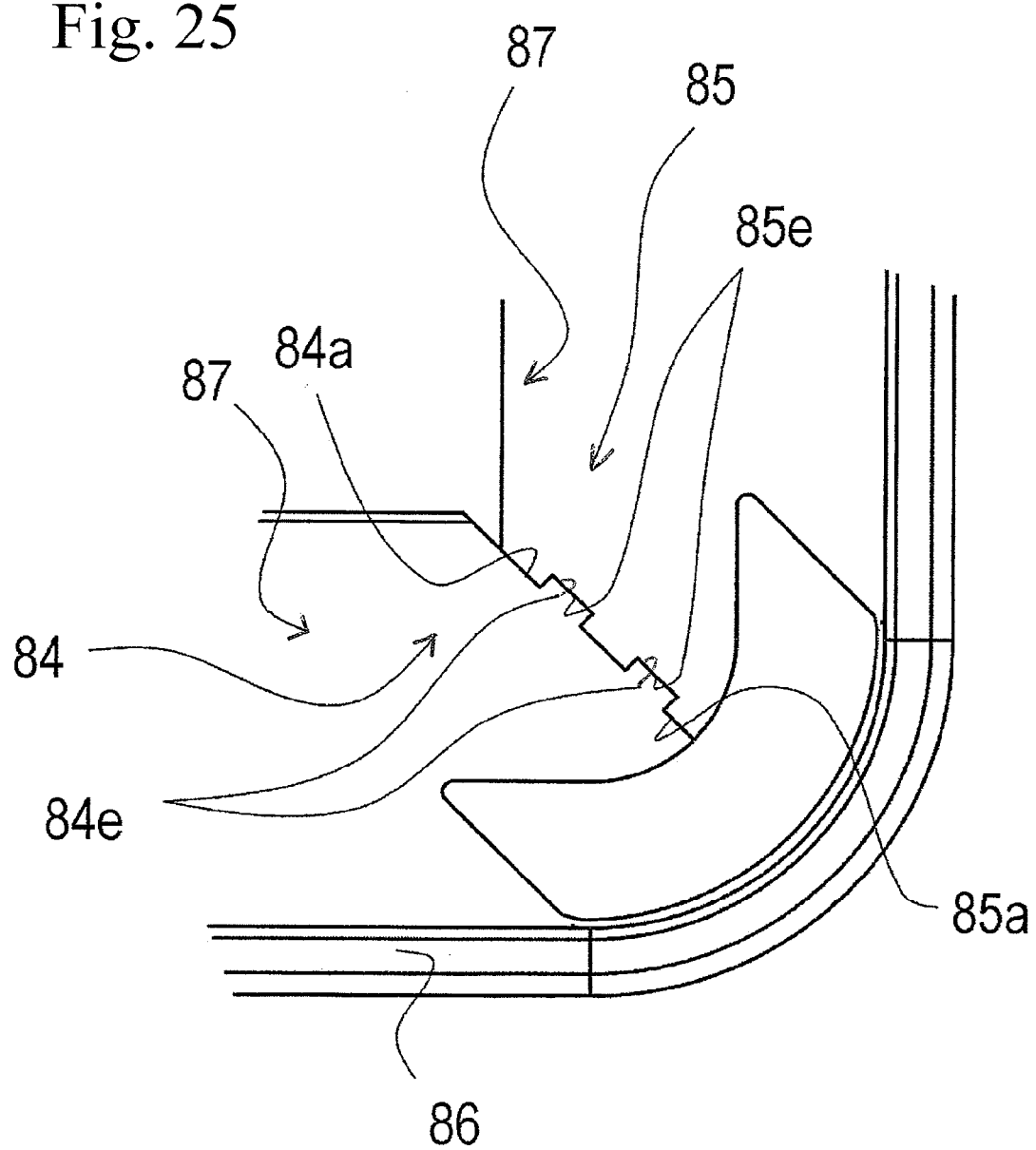
FIG. 25 is a plan view of the corner portion of the frame according to yet another modified example.

Note that, as shown in FIGS. 23-25, the configuration not having an engaging piece and an engaging concave portion may be employed. In FIG. 23, a fitting convex portion 84c and a fitting concave portion 85c take a semicircular shape. In FIG. 24, a fitting convex portion 84d and a fitting concave portion 85d take a rectangular shape. In FIG. 25, the shape is such that a fitting convex portion 84e and a fitting concave portion 85e, which have a rectangular shape, are arranged at plural points. Since there is no engaging configuration, the counter restoring force is smaller than the configuration shown in FIGS. 21 and 22, but constant counter restoring force is obtained by frictional force. Moreover, with such a configuration, it is possible to make force of fitting at the time of the bending processing small.

Figure 26:
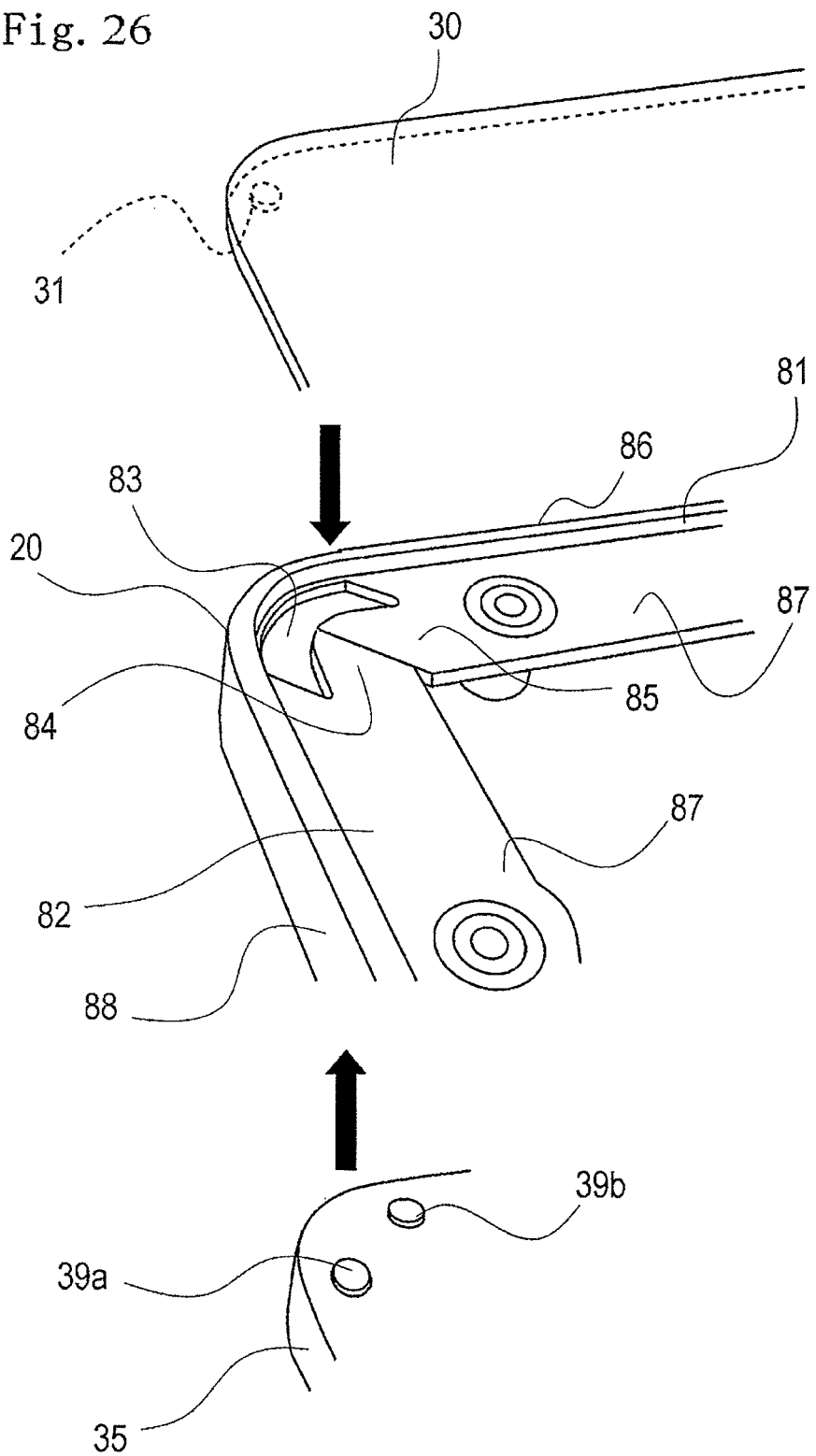
FIG. 26 is a perspective view of the corner portion of the frame according to a modified example of the embodiment.
Figure 27:
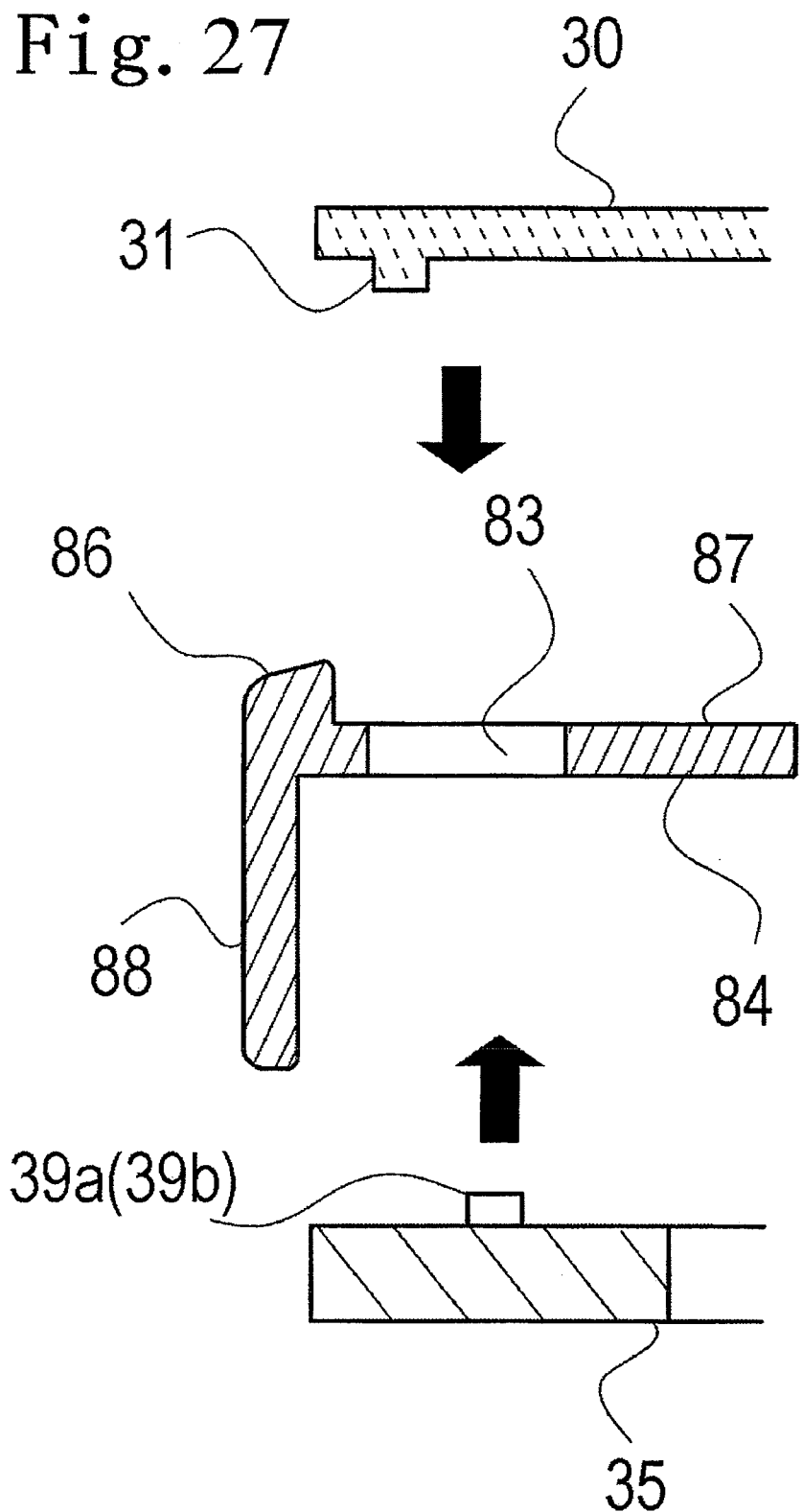
FIG. 27 is a cross-sectional view of the corner portion shown in FIG. 26.

FIGS. 26 and 27 are perspective views of a modified example of the corner portion of the second frame 80 and show the modified example of the fitting configuration of the bending hole portion 83 and the fitting convex portion 39 shown in FIG. 11. Specifically, in the front cabinet frame 35, two cylindrical positioning convex portions 39a and 39b are formed instead of the fitting convex portion 39. These positioning convex portions 39a and 39b are inserted in a part in the vicinity of both sides of the bending hole portion 83. Therefore, a center part of the bending hole portion 83 becomes empty. In addition, in the empty part, a positioning convex portion 31 which is formed in a corner rear face part of the transparent protection cover 30 arranged on the front face side of the frame 20 (second frame 80) is inserted. That is, in the bending hole portion 83, the two positioning convex portions 39a and 39b of the front cabinet frame 35 are inserted from the rear face side and the positioning convex portion 31 of the transparent protection cover 30 is inserted from the front face side, respectively. With such a configuration, it is also possible to obtain an effect of positioning and misalignment prevention of the transparent protection cover 30.

REFERENCE SIGNS LIST 10 liquid crystal television
20 frame
25 positioning projection portion 25
30 transparent protection cover
31 positioning convex portion
35 front cabinet frame
37 positioning boss hole 37
39 fitting convex portion
39a, 39b positioning convex portion
40 rear cabinet
50 sheet group
51 liquid crystal panel
52 Df sheet
53 lens sheet
54 light guide plate
55 diffusion sheet
56 reflection plate
60 back light chassis
70 first frame
79, 89, 79a, 79b, 89a, 89b frame side screw hole
80 second frame
81 bottom front face portion
82 side portion
83 bending hole portion
84 first restricting convex portion
84a restricting face
84b to 84e fitting convex portion
85 second restricting convex portion
85a restricting face
85b engaging concave portion
85b to 85e fitting concave portion
86 outer peripheral projection portion
87 protection cover arranging portion
88 frame side face portion
88a light leakage prevention deep portion
90 connection member
92, 92a, 92b connection member side screw hole
99 flat head screw

The invention claimed is:

1. A thin display device provided with a metallic frame, wherein
the frame is configured by connecting a plurality of frame members subjected to bending processing,
in a part subjected to the bending processing, a predetermined-cut shape is formed before the bending processing, and
a notch is formed for the bending processing at the fore end of the predetermined-cut shape.

2. A thin display device provided with a metallic frame of claim 1, wherein
the predetermined-cut shape is a V-Cut shape, and
in the part subjected to the bending processing, the notch for bending processing and two restricting means are formed,
wherein two restricting means restrict an amount of the bending processing to a predetermined amount by the V-Cut shape separation before processing and by abutting each other at the time of processing.

* * * * *